US011613258B2

(12) United States Patent
Oguro

(10) Patent No.: US 11,613,258 B2
(45) Date of Patent: Mar. 28, 2023

(54) VEHICLE CONTROL DEVICE

(71) Applicant: SUBARU CORPORATION, Tokyo (JP)

(72) Inventor: Chihiro Oguro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 227 days.

(21) Appl. No.: 17/081,524

(22) Filed: Oct. 27, 2020

(65) Prior Publication Data

US 2021/0188278 A1    Jun. 24, 2021

(30) Foreign Application Priority Data

Dec. 24, 2019 (JP) .............................. JP2019-232289

(51) Int. Cl.
*B60W 30/18* (2012.01)
*B60W 10/04* (2006.01)

(52) U.S. Cl.
CPC ...... *B60W 30/18172* (2013.01); *B60W 10/04* (2013.01); *B60W 2510/0609* (2013.01); *B60W 2520/105* (2013.01); *B60W 2520/26* (2013.01)

(58) Field of Classification Search
CPC ........... B60W 30/18172; B60W 10/04; B60W 2510/0609; B60W 2520/105; B60W 2520/26; B60W 2540/10; Y02T 10/07
USPC ........................................................ 701/90
See application file for complete search history.

(56) References Cited

U.S. PATENT DOCUMENTS

| 2012/0191282 | A1* | 7/2012 | Maki | B60W 30/18172 |
| | | | | 180/65.265 |
| 2012/0277943 | A1* | 11/2012 | Kim | B60W 30/20 |
| | | | | 903/903 |
| 2018/0264926 | A1* | 9/2018 | Matsuo | B60K 6/445 |
| 2018/0326852 | A1* | 11/2018 | Shiozawa | B60W 30/00 |
| 2019/0359050 | A1* | 11/2019 | Komuro | B60K 6/48 |
| 2019/0381895 | A1* | 12/2019 | Shindo | B60L 7/18 |
| 2020/0180632 | A1* | 6/2020 | Morita | B60T 8/00 |
| 2020/0391742 | A1* | 12/2020 | Ariyoshi | B60W 20/17 |

(Continued)

FOREIGN PATENT DOCUMENTS

| JP | 2003-174702 A | 6/2003 |
| JP | 2012-232729 A | 11/2012 |
| JP | 2015-136207 A | 7/2015 |

*Primary Examiner* — Jonathan M Dager
*Assistant Examiner* — Jean W Charleston
(74) *Attorney, Agent, or Firm* — McGinn I.P. Law Group, PLLC.

(57) ABSTRACT

A vehicle control device includes a driving force setting unit and a motor controller. The driving force setting unit sets a first requested driving force on the basis of accelerator opening and makes dulling processing on it to set a second requested driving force. The motor controller controls a motor driving force on the basis of the second requested driving force. The motor controller executes a slip control on the condition that the driving wheel slips on accelerated travel. The slip control includes controlling the motor driving force on the basis of a limited driving force smaller than the second requested driving force. In stopping the slip control, the motor controller compares the first requested driving force and the motor driving force. On the condition that the former is smaller than the latter, the motor controller controls the motor driving force on the basis of the first requested driving force.

18 Claims, 8 Drawing Sheets

(56) References Cited

U.S. PATENT DOCUMENTS

2021/0001730 A1\* 1/2021 Shindo ................ B60L 15/2009
2021/0162979 A1\* 6/2021 Ariyoshi ............... B60W 10/08

\* cited by examiner

VEHICLE CONTROL DEVICE

CROSS-REFERENCE TO RELATED APPLICATIONS

This application claims priority from Japanese Patent Application No. 2019-232289 filed on Dec. 24, 2019, the entire contents of which are hereby incorporated by reference.

BACKGROUND

The disclosure relates to a vehicle control device that controls a traveling motor coupled to a driving wheel.

Vehicles such as electric vehicles and hybrid vehicles include a traveling motor coupled to a driving wheel. For example, reference is made to Japanese Unexamined Patent Application Publication (JP-A) Nos. 2003-174702, 2012-232729, and 2015-136207.

SUMMARY

An aspect of the technology provides a vehicle control device configured to control a traveling motor coupled to a driving wheel. The vehicle control device includes a driving force setting unit and a motor controller. The driving force setting unit is configured to set a first requested driving force on the basis of accelerator opening, and make dulling processing on the first requested driving force to set a second requested driving force. The motor controller is configured to control, on the basis of the second requested driving force, a motor driving force to be outputted from the traveling motor. The motor controller is configured to execute a slip control on the condition that the driving wheel slips on accelerated travel. The slip control includes controlling the motor driving force on the basis of a limited driving force smaller than the second requested driving force. In stopping the slip control, the motor controller is configured to compare the first requested driving force and the motor driving force to determine magnitude relation. On the condition that the first requested driving force is smaller than the motor driving force, the motor controller is configured to control the motor driving force on the basis of the first requested driving force.

An aspect of the technology provides a vehicle control device configured to control a traveling motor coupled to a driving wheel. The vehicle control device includes circuitry. The circuitry is configured to set a first requested driving force on the basis of accelerator opening, and make dulling processing on the first requested driving force to set a second requested driving force. The circuitry is configured to control, on the basis of the second requested driving force, a motor driving force to be outputted from the traveling motor. The circuitry is configured to execute a slip control on the condition that the driving wheel slips on accelerated travel. The slip control includes controlling the motor driving force on the basis of a limited driving force smaller than the second requested driving force. In stopping the slip control, the circuitry is configured to compare the first requested driving force and the motor driving force to determine magnitude relation. On the condition that the first requested driving force is smaller than the motor driving force, the circuitry is configured to control the motor driving force on the basis of the first requested driving force.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
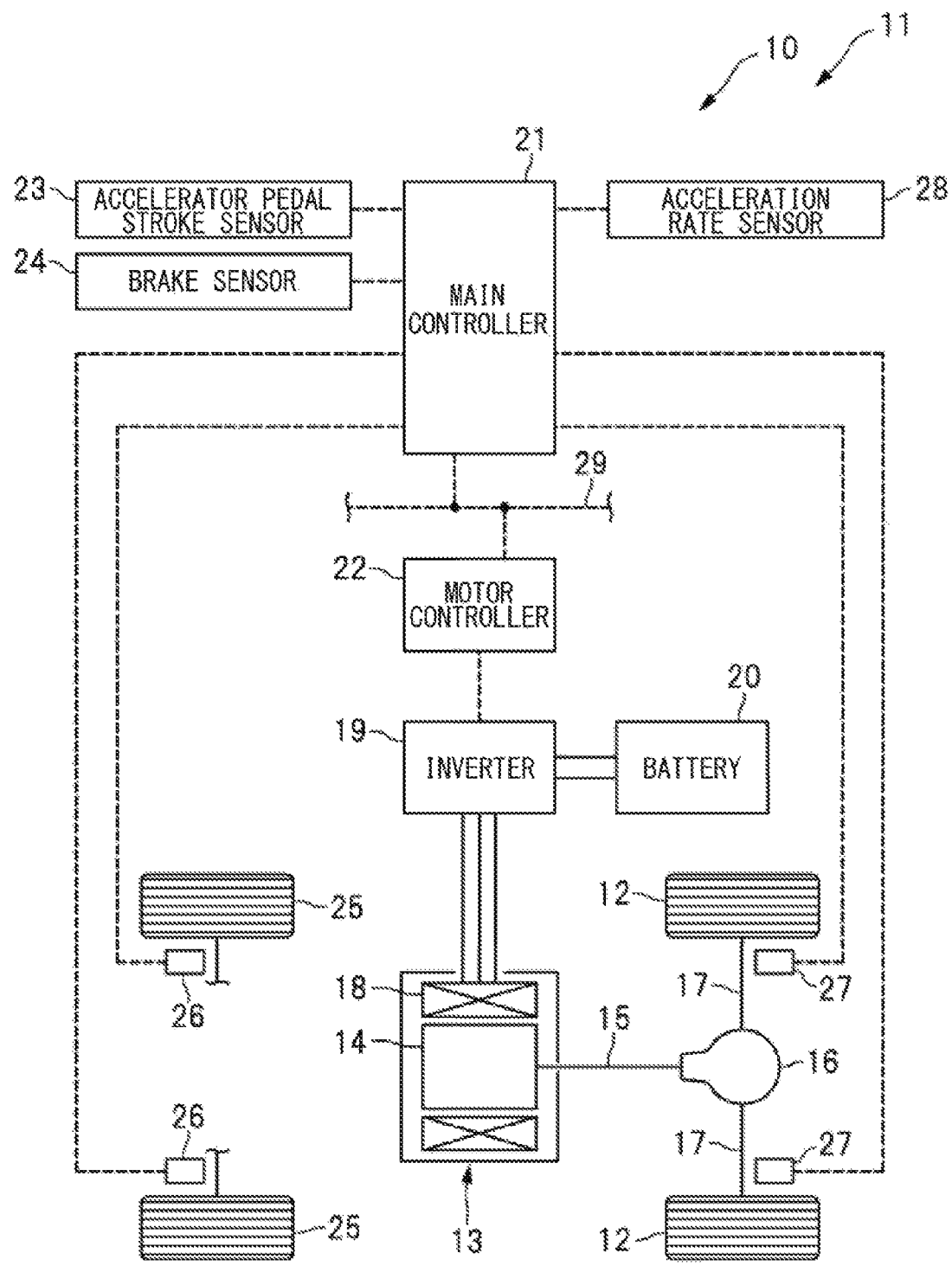
FIG. 1 is a schematic diagram of a configuration example of a vehicle including a vehicle control device according to an embodiment of the disclosure.

A target driving force of a traveling motor is controlled on the basis of an accelerator operation by an occupant, but in a case with driving wheel slip on accelerated travel, a slip control is executed. The slip control includes reducing the target driving force automatically.

The slip control is provided for suppression of wheel slip on accelerated travel, and may be optionally stopped in accompaniment with, for example, release of stepping down of an accelerator pedal. However, if the accelerator operation is canceled to stop the slip control on low-μ road travel on, for example, a snowy road, the reduction of the target driving force by the slip control would be also canceled, possibly causing the driving wheel slip again, depending on new setting of the target driving force. What is desired is, therefore, to control the traveling motor appropriately in stopping the slip control.

It is desirable to provide a vehicle control device that makes it possible to control a traveling motor appropriately in stopping a slip control.

In the following, some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

(Vehicle Configuration)

FIG. 1 schematically illustrates a configuration example of a vehicle 11 including a vehicle control device 10 according to an embodiment of the disclosure. Referring to FIG. 1, the vehicle 11 includes rear wheels 12 and a motor generator 13 coupled to the rear wheels 12. In one embodiment of the disclosure, the rear wheels 12 may each serve as a "driving wheel". In one embodiment of the disclosure, the motor generator 13 may serve as a "traveling motor". The motor generator 13 includes a rotor 14 and a stator 18. To the rotor 14, the rear wheels 12 may be coupled through a motor output shaft 15, a differential mechanism 16, and wheel drive shafts 17. To the stator 18, an inverter 19 as electric converter equipment may be coupled. To the inverter 19, a battery 20 such as a lithium ion battery may be coupled. It is to be noted that the vehicle 11 in the figure is a rear-wheel drive vehicle, but this is non-limiting. The vehicle 11 may be a front-wheel drive vehicle or an all-wheel drive vehicle.

The vehicle control device 10 may include a main controller 21 and a motor controller 22, to control a motor driving force of the motor generator 13. The main controller 21 and the motor controller 22 may include, for example, a microcomputer. In one embodiment of the disclosure, the main controller 21 may serve as a "driving force setting unit". In one embodiment of the disclosure, the motor controller 22 may serve as a "motor controller". The main controller 21 may set a requested driving force as a target driving force, on the basis of, for example, accelerator opening, and output the requested driving force to the motor controller 22. The motor controller 22 may control, on the basis of the requested driving force, the motor driving force to be outputted from the motor generator 13.

To the main controller 21, sensors may be coupled. The sensors may include, for example, an accelerator pedal stroke sensor 23 and a brake sensor 24. The accelerator pedal stroke sensor 23 may detect an amount of stepping down of an accelerator pedal. The amount of stepping down of the accelerator pedal is hereinafter referred to as the accelerator opening. The brake sensor 24 may detect an amount of stepping down of a brake pedal. The sensors to be coupled to the main controller 21 may further include, for example, a front-wheel speed sensor 26, a rear-wheel speed sensor 27, and an acceleration rate sensor 28. The front-wheel speed sensor 26 may detect rotation speeds of front wheels 25. The rear-wheel speed sensor 27 may detect rotation speeds of the rear wheels 12. The acceleration rate sensor 28 may detect an acceleration rate that acts on the vehicle 11. It is to be noted that the main controller 21 and the motor controller 22 may be coupled to each other, and are configured to communicate with each other, through an on-vehicle network 29 such as CAN (Controller Area Network).

(Setting of Requested Driving Force)

Figure 2:
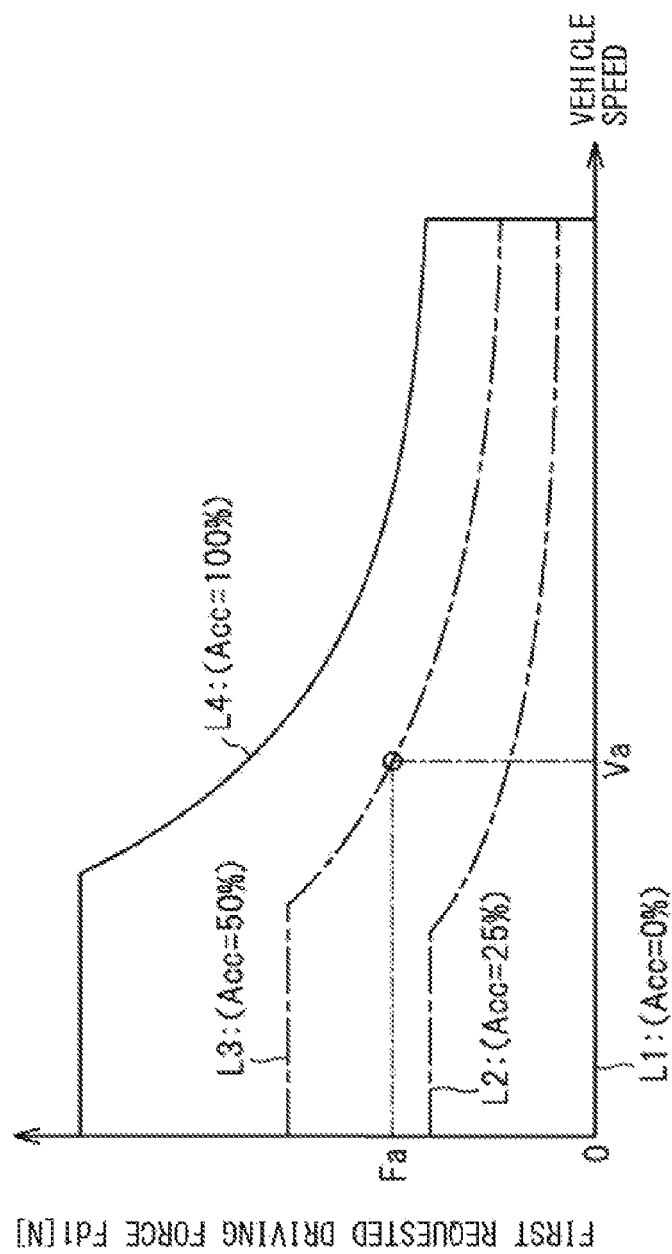
FIG. 2 illustrates an example of a driving force map for setting of a first requested driving force.
Figure 3:
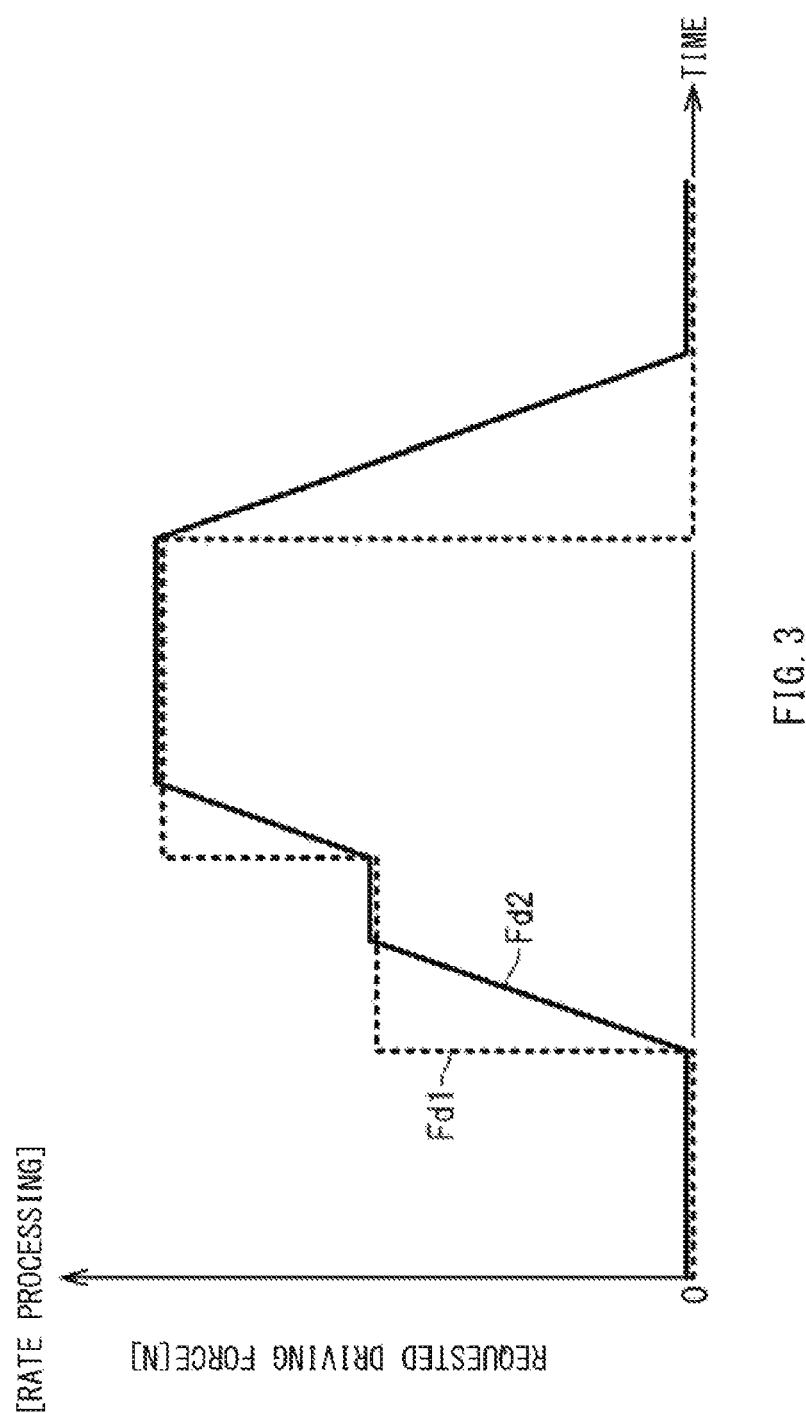
FIG. 3 illustrates an example of progress in execution of rate processing on the first requested driving force.

Description now moves on to setting of requested driving forces Fd1 and Fd2 by the main controller 21. FIG. 2 illustrates an example of a driving force map for setting of a first requested driving force Fd1. FIG. 3 illustrates an example of progress in execution of rate processing on the first requested driving force Fd1. As illustrated in FIG. 2, on the driving force map, characteristic lines L1 to L4 are set. The characteristic lines L1 to L4 indicate the first requested driving force Fd1 corresponding to respectively different values of accelerator opening Acc. For example, in a case where the accelerator opening Acc is 0%, the first requested driving force Fd1 may be set on the characteristic line L1. In a case where the accelerator opening Acc is 25%, the first requested driving force Fd1 may be set on the characteristic line L2. In a case where the accelerator opening Acc is 50%, the first requested driving force Fd1 may be set on the characteristic line L3. In a case where the accelerator opening Acc is 100%, the first requested driving force Fd1 may be set on the characteristic line L4. For example, in a case where the accelerator opening Acc is 50%, the first requested driving force Fd1 for a vehicle speed Va may be set at Fa. The first requested driving force Fd1 means a driving force to be requested by a driver.

It is to be noted that on the driving force map in FIG. 2, the four characteristic lines L1 to L4 are set as an example, but this is non-limiting. A driving force map may be adopted in which five or more characteristic lines are set. Moreover, in the example illustrated in the driving force map in FIG. 2, in a case where the accelerator opening Acc is 0%, the first requested driving force Fd1 is set at zero on the characteristic line L1, but this is non-limiting. In the case where the accelerator opening Acc is 0%, the first requested driving force Fd1 may be set on regenerative-power-generation side, i.e., on negative side.

Moreover, to suppress a rapid change in the driving force of the motor generator 13, the main controller 21 makes rate processing on the first requested driving force Fd1 to set a second requested driving force Fd2, and outputs the second requested driving force Fd2 after the rate processing to the motor controller 22. In one embodiment of the disclosure, the rate processing may serve as "dulling processing". That is, as illustrated in FIG. 3, the first requested driving force Fd1 is set on the basis of the accelerator opening, and thereupon, the first requested driving force Fd1 is subjected to the rate processing. The rate processing includes limiting a rate of change in the first requested driving force Fd1. Thus, the second requested driving force Fd2 is set in which the first requested driving force Fd1 is gently changed. In other words, even in a case where the first requested driving force Fd1 rapidly increases or decreases due to a sudden accelerator operation, the second requested driving force Fd2 as a control target of the motor generator 13 gradually increases or decreases. Controlling the motor generator 13 using such a second requested driving force Fd2 makes it possible to prevent the rapid change in the driving force of the motor generator 13. Hence, it is possible to control the motor generator 13 without giving the sense of discomfort to an occupant.

(Slip Control)

Figure 4:
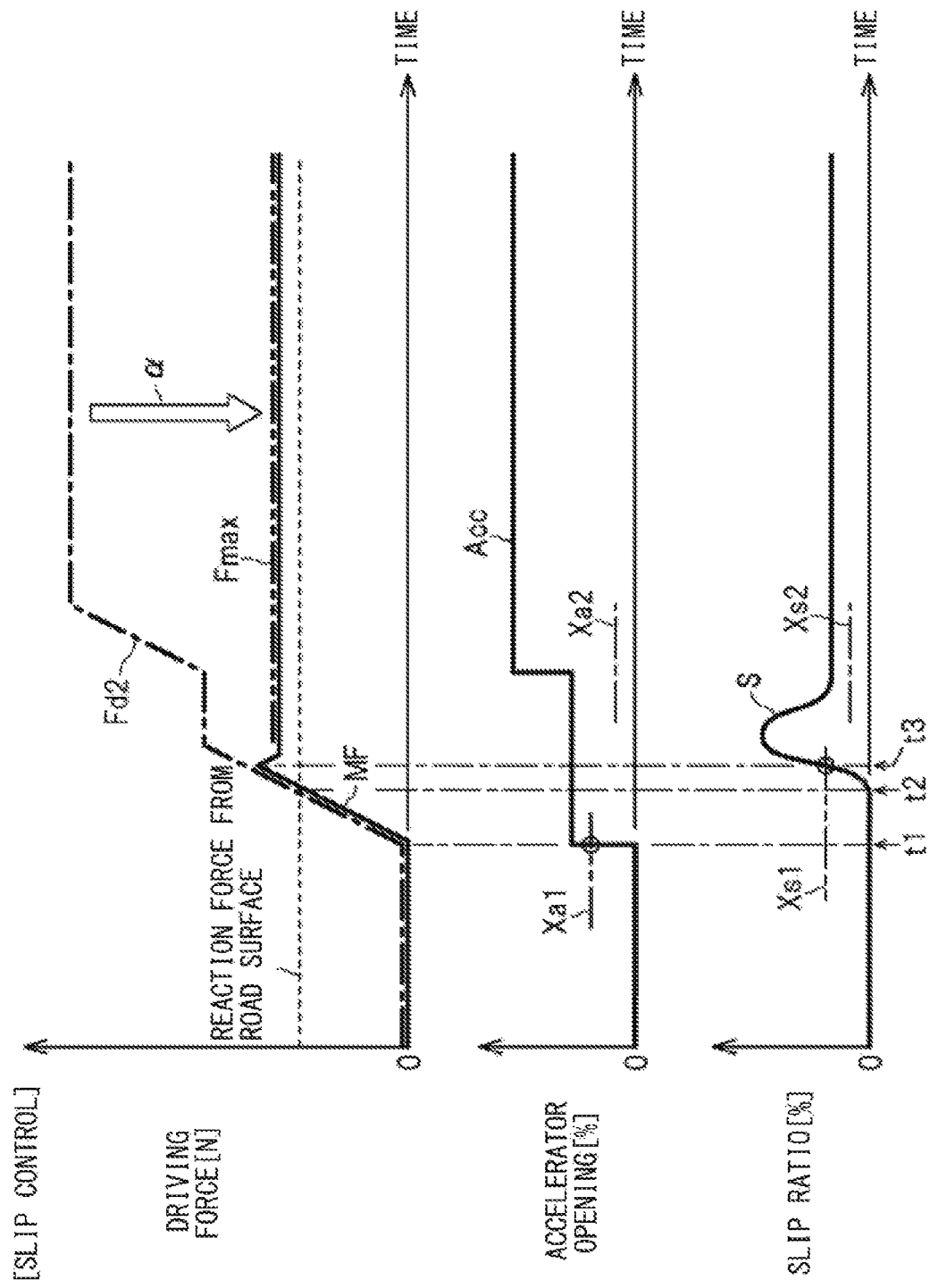
FIG. 4 illustrates an example of progress in execution of a slip control on a low-μ road such as a snowy road.

Description is given next of a slip control by the motor controller 22. FIG. 4 illustrates an example of progress in execution of the slip control on a low-μ road such as a snowy road. A slip ratio S illustrated in FIG. 4 is a value indicating a wheel slip state of the rear wheel 12 on accelerated travel. The slip ratio S may be calculated using the following expression (1).

$$S = \{(Vr - Vv)/Vv\} \times 100 \qquad (1)$$

In the expression (1), Vr denotes a rotation speed of the driving wheel, i.e., a rear-wheel speed, and Vv denotes a moving speed of the vehicle 11, i.e., the vehicle speed. That is, in a case where the rear wheel 12 does not slip and the rear-wheel speed Vr matches the vehicle speed Vv, the slip ratio S is calculated as 0%. In a case where the rear wheel 12 slips and the rear-wheel speed Vr becomes greater than the vehicle speed Vv, the slip ratio S is calculated as a greater value. It is to be noted that as the vehicle speed Vv, for example, a front-wheel speed as a speed of a driven wheel may be used. Alternatively, as the vehicle speed Vv, the moving speed of the vehicle 11 calculated from, for example, the acceleration rate of the vehicle may be used. In another alternative, as the vehicle speed Vv, the moving speed of the vehicle 11 calculated from a position signal of GNSS (Global Navigation Satellite System) such as GPS (Global Positioning System) may be used.

The slip control as used here refers to a control of reducing the motor driving force, to suppress the wheel slip of the rear wheel 12 on the accelerated travel. Non-limiting examples of a condition of execution of the slip control may include that the accelerator opening Acc is greater than a predetermined threshold Xa1 and the slip ratio S is greater than a predetermined threshold Xs1. Non-limiting examples of a condition of a stop of the slip control may include that the accelerator opening Acc becomes smaller than a predetermined threshold Xa2, and that the slip ratio S becomes smaller than a predetermined threshold Xs2.

It is to be noted that as illustrated in FIG. 4, from the viewpoint of suppression of control hunting, the two thresholds Xa1 and Xa2 are set for comparison with the accelerator opening Acc, and the two thresholds Xs1 and Xs2 are set for comparison with the slip ratio S, but this is non-limiting. A single threshold may be provided for the comparison with the accelerator opening Acc to determine the condition of the execution and/or the condition of the stop. A single threshold may be provided for the comparison with the slip ratio S to determine the condition of the execution and/or the condition of the stop.

As illustrated in FIG. 4, at time t1, the accelerator pedal is stepped down to cause the accelerator opening Acc to become greater. Thereupon, the second requested driving force Fd2 starts to rise, following which the motor driving force MF starts to rise. Thereafter, at time t2, the second requested driving force Fd2 rises to become greater than a reaction force from the road surface, following which the motor driving force MF becomes greater than the reaction force from the road surface. Thus, the rear wheel 12 starts to slip and the slip ratio S starts to rise. Thereafter, at time t3, with the accelerator opening Acc being greater than the threshold Xa1, the slip ratio S rises and becomes greater than the threshold Xs1. This causes execution of the slip control, to suppress the wheel slip of the rear wheel 12. The slip control includes reducing the motor driving force MF.

The slip control may include setting a limited driving force Fmax smaller than the second requested driving force Fd2, and controlling the motor driving force MF not to become greater than the limited driving force Fmax. In other words, even in a case where the second requested driving force Fd2 is set to a relatively great value on the basis of the accelerator opening Acc, the motor driving force MF is reduced to the limited driving force Fmax, as indicated by an arrow a. The limited driving force Fmax may be set to magnitude great enough to maintain the predetermined slip ratio S, e.g., 10%. That is, in a case where the slip ratio S is greater than a predetermined value, the limited driving force Fmax is reduced. In a case where the slip ratio S is smaller than the predetermined value, the limited driving force Fmax is increased. Thus, the limited driving force Fmax in the slip control is set to magnitude slightly greater than the reaction force from the road surface.

As described, the slip ratio S becomes greater than the threshold Xs1 on the accelerated travel, and thereupon, the slip control is executed to set the limited driving force Fmax. This causes the motor driving force MF to be automatically reduced even if the accelerator pedal is being stepped down. Thus, even on low-µ road travel on, for example, a snowy road, it is possible to prevent excessive wheel slip of the rear wheel 12 as the driving wheel, making it possible to stabilize the vehicle 11 on the accelerated travel.

(Reference Example: Acceleration Stop on Low-µ Road Travel]

Figure 5:
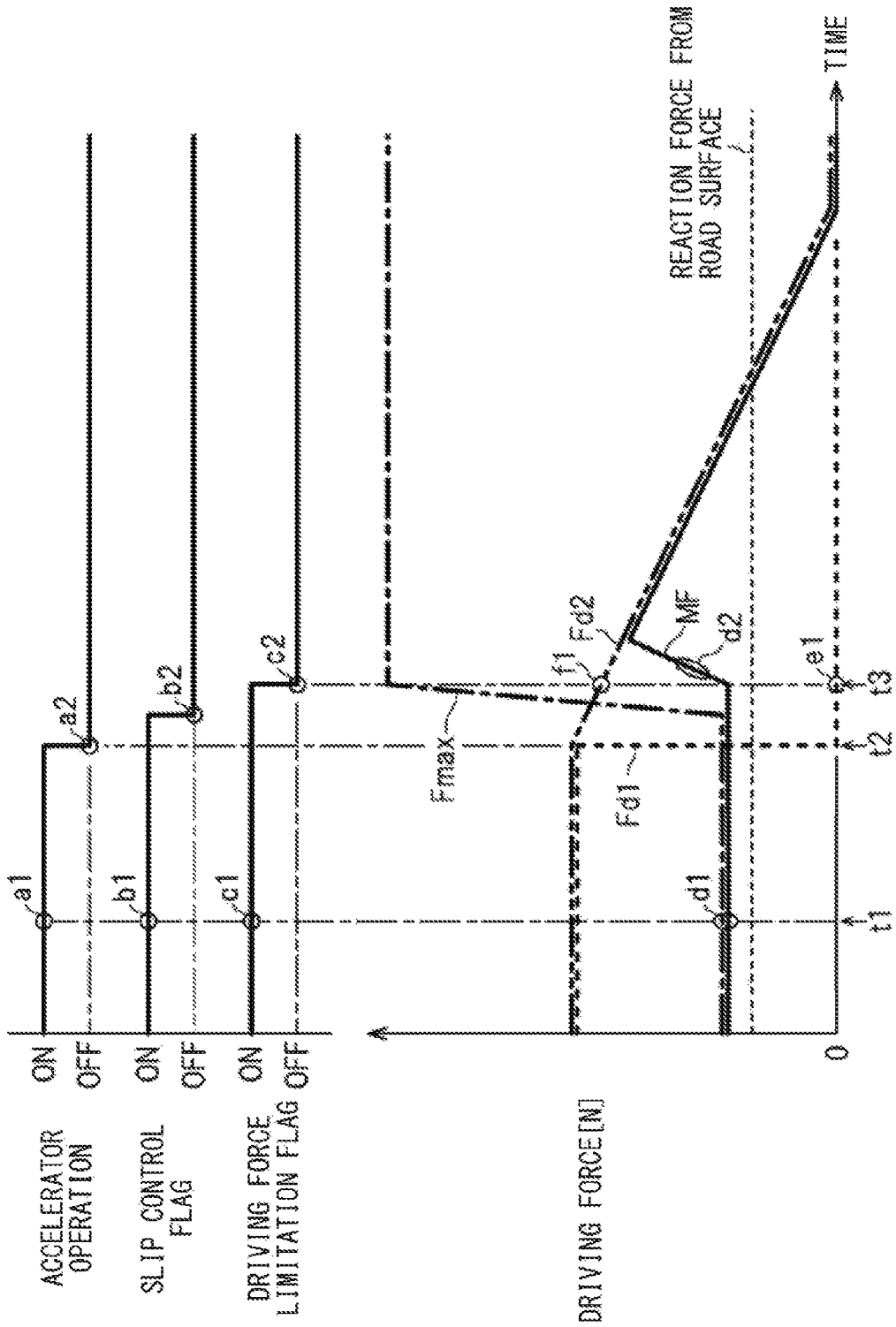
FIG. 5 is a timing chart of a reference example of the progress in the execution of the slip control.

Description is given next of a case where the slip control is executed on the accelerated travel on a low-µ road, and thereafter, the stepping down of the accelerator pedal is released. FIG. 5 is a timing chart of a reference example of the progress in the execution of the slip control. In FIG. 5, and in FIGS. 7 and 8 described later, the accelerator operation being ON means a situation that the accelerator opening Acc is greater than the threshold Xa1. The accelerator operation being OFF means a situation that the accelerator opening Acc is smaller than the threshold Xa2. The slip control flag being ON means a situation that the condition of the execution of the slip control is established, i.e., a situation that the slip control is executed by the motor controller 22. The slip control flag being OFF means a situation that the condition of the stop of the slip control is established, i.e., a situation that the slip control by the motor controller 22 is stopped. The driving force limitation flag being ON means a situation that the main controller 21 recognizes the execution of the slip control by the motor controller 22. The driving force limitation flag being OFF means a situation that the main controller 21 recognizes the stop of the slip control by the motor controller 22.

As illustrated in FIG. 5, at time t1, the situation is that the accelerator operation is ON (reference characters a1), the slip control flag is ON (reference characters b1), and the driving force limitation flag is ON (reference characters c1). This is a situation that the slip control is in execution. In the slip control, the limited driving force Fmax is set to suppress the wheel slip of the rear wheel 12, and the motor driving force MF is limited not to become greater than the limited driving force Fmax (reference characters d1).

Thereafter, from time t2 to time t3, the stepping down of the accelerator pedal is released and the accelerator operation is turned OFF (reference characters a2), and thereupon, the condition of the stop of the slip control is established. This causes the slip control flag to be turned OFF (reference characters b2) and the driving force limitation flag is turned OFF (reference characters c2). At this occasion, since the stepping down of the accelerator pedal has been released, the first requested driving force Fd1 based on the accelerator opening decreases to zero (0) (reference characters e1). But the second requested driving force Fd2 subjected to the rate processing maintains predetermined magnitude (reference characters f1).

At time t3, since the slip control has been stopped, the motor generator 13 is controlled toward the second requested driving force Fd2. However, since the second requested driving force Fd2 is greater than the motor driving force MF that is being actually outputted, the motor driving force MF rises in accompaniment with the stop of the slip control (reference characters d2). As described, although the stepping down of the accelerator pedal has been released, the motor driving force MF rises in accompaniment with the stop of the slip control. This may cause the wheel slip of the rear wheel 12 while giving the sense of discomfort to a driver. Thus, the vehicle control device 10 of this embodiment may execute a transition control described below, after the condition of the stop of the slip control is established. Hence, it is possible to control the motor generator 13 appropriately without giving the sense of discomfort to the driver.

(Transition Control: Flowchart)

Figure 6:
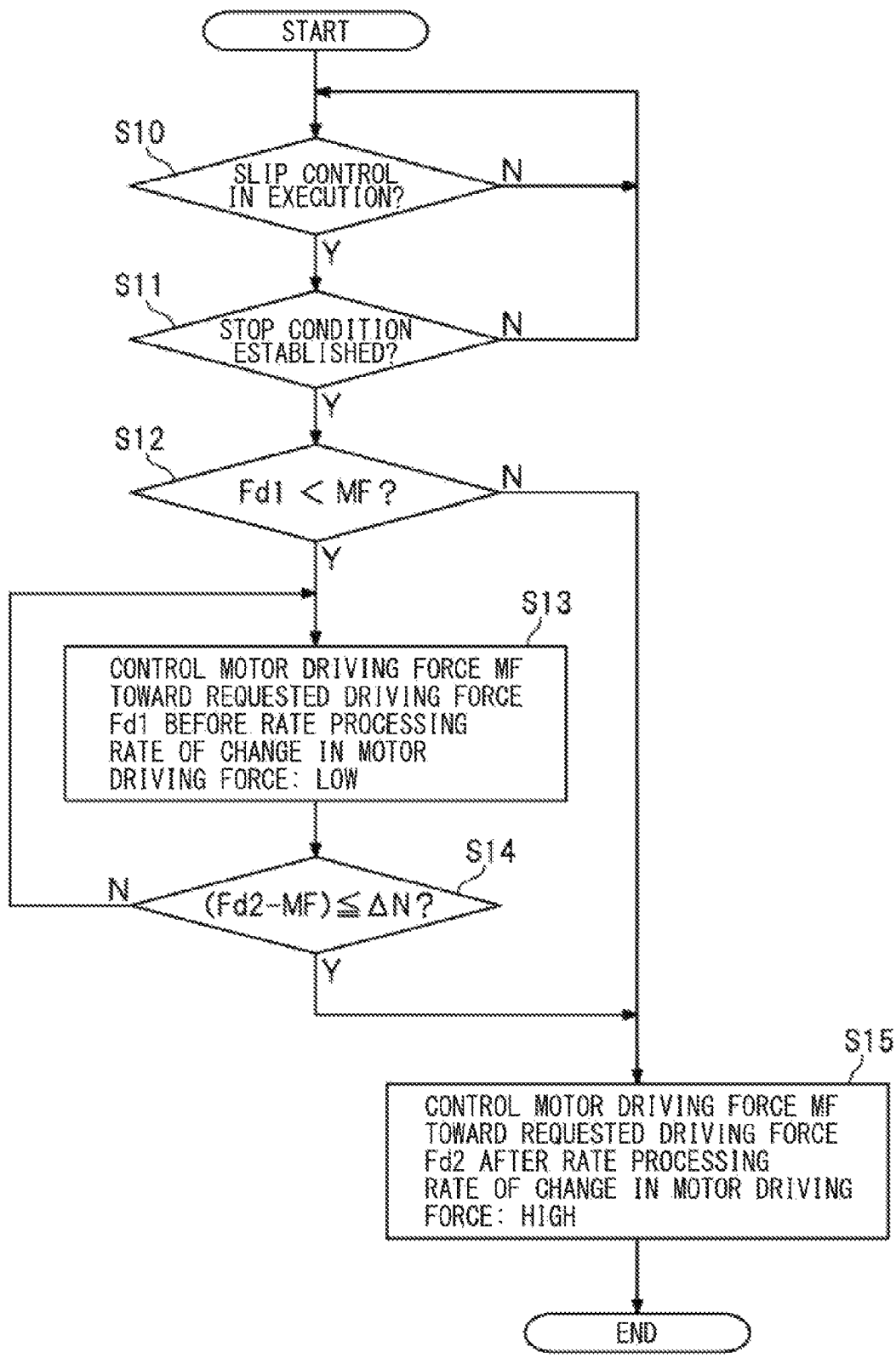
FIG. 6 is a flowchart of an example of an execution procedure of a transition control.

FIG. 6 is a flowchart of an example of an execution procedure of the transition control. As illustrated in FIG. 6, in step S10, a determination may be made as to whether or not the slip control is in execution. In step S10, in a case with a determination that the slip control is in execution (Y in step S10), the flow may proceed to step S11, in which a determination is made as to whether or not the condition of the stop of the slip control is established. In step S11, in a case where the condition of the stop of the slip control is established (Y in step S11), that is, in a case where the accelerator opening Acc is smaller than the predetermined threshold Xa2 or in a case where the slip ratio S is smaller than the predetermined threshold Xs2, the flow may proceed to step S12, in which the first requested driving force Fd1 and the motor driving force MF are compared to determine their magnitude relation.

In step S12, in a case with a determination that the first requested driving force Fd1 is smaller than the motor driving force MF (Y in step S12), the flow may proceed to step S13, in which the motor driving force MF is controlled toward the first requested driving force Fd1 before the rate processing. Thereafter, in step S14, a determination may be made as to whether a difference between the second requested driving force Fd2 and the motor driving force MF is equal to or smaller than a predetermined value AN. In step S14, in a case where the difference between the second requested driving force Fd2 and the motor driving force MF is greater than the predetermined value AN (N in step S14), that is, in a case where the motor driving force MF is deviated from the second requested driving force Fd2, the flow may return to step S13, in which the motor driving force MF is controlled toward the first requested driving force Fd1 before the rate processing.

Meanwhile, in step S14, in a case where the difference between the second requested driving force Fd2 and the motor driving force MF is equal to or smaller than the predetermined value AN (Y in step S14), that is, in a case where the motor driving force MF becomes close to the second requested driving force Fd2, the flow may proceed to step S15, in which the motor driving force MF is controlled toward the second requested driving force Fd2 after the rate processing. Moreover, in step S12, in a case with a determination that the first requested driving force Fd1 is equal to or greater than the motor driving force MF (N in step S12), the flow may proceed to step S15, in which the motor driving force MF is controlled toward the second requested driving force Fd2 after the rate processing.

As described, in step S11, in the case with the determination that the condition of the stop of the slip control is established (Y in step S11), the flow may proceed to step S12, in which the first requested driving force Fd1 and the motor driving force MF are compared to determine their magnitude relation. In the case where the first requested driving force Fd1 before the rate processing is smaller than the motor driving force MF (Y in step S12), the flow may proceed to step S13, in which the motor driving force MF is controlled toward the first requested driving force Fd1 before the rate processing. Meanwhile, in the case where the first requested driving force Fd1 before the rate processing is greater than the motor driving force MF (N in step S12), the flow may proceed to step S15, in which the motor driving force MF is controlled toward the second requested driving force Fd2 after the rate processing. It is to be noted that a rate of change in the driving force in controlling the motor driving force MF in step S13 may be set at a lower value than the rate of change in the driving force in controlling the motor driving force MF in step S15.

(Transition Control: Timing Chart, Part 1)

Figure 7:
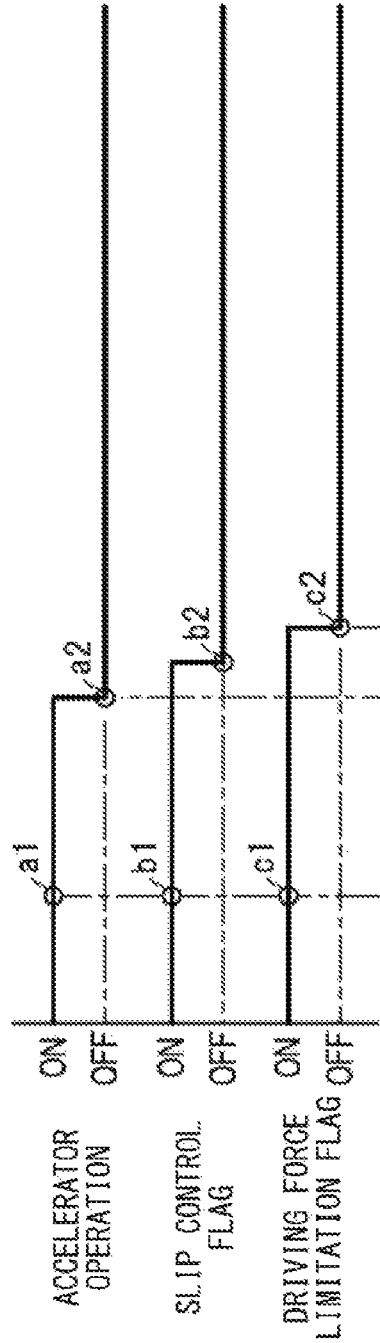
FIG. 7 is a timing chart of progress in execution of the slip control and the transition control.
Figure 7:
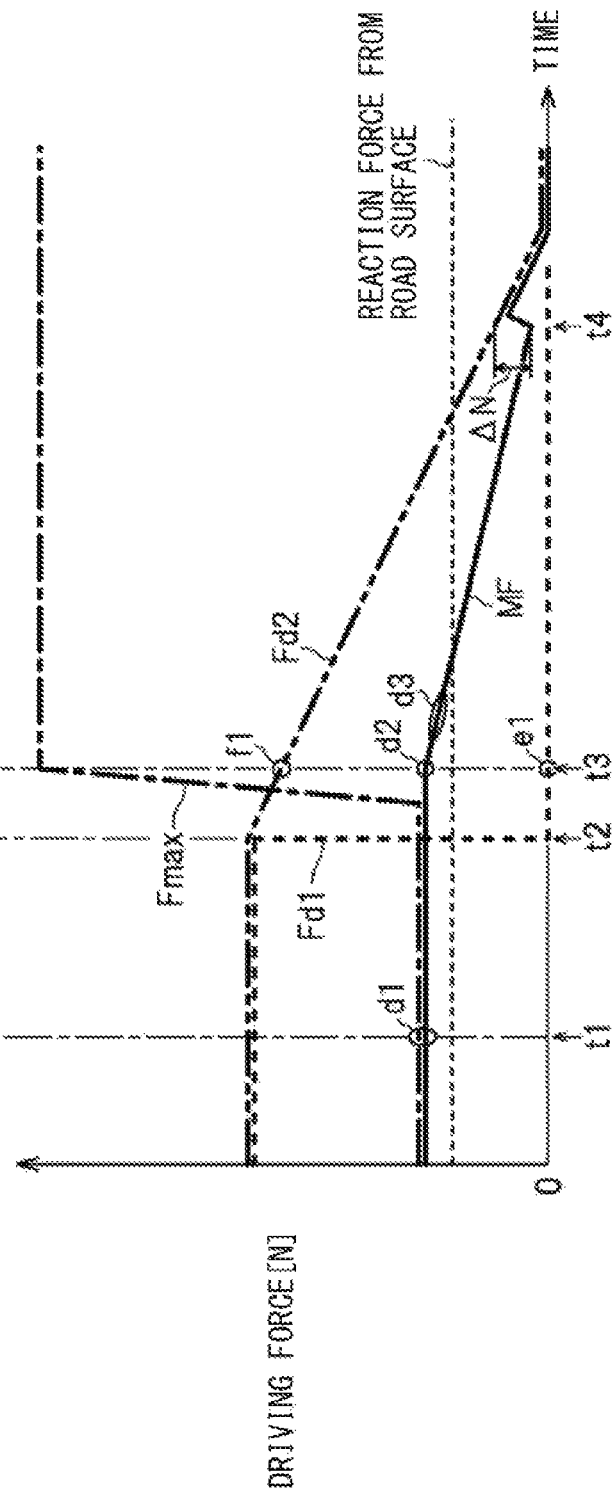

Description is given next of the transition control in a case where the slip control is executed on the accelerated travel on the low-μ road, and thereafter, the stepping down of the accelerator pedal is released, causing the stop of the slip control. FIG. 7 is a timing chart of progress in execution of the slip control and the transition control.

As illustrated in FIG. 7, at time t1, the situation is that the accelerator operation is ON (reference characters a1), the slip control flag is ON (reference characters b1), and the driving force limitation flag is ON (reference characters c1). This is a situation that the slip control is in execution. In the slip control, the limited driving force Fmax is set to suppress the wheel slip of the rear wheel 12, and the motor driving force MF is limited not to become greater than the limited driving force Fmax (reference characters d1).

Thereafter, from time t2 to time t3, the stepping down of the accelerator pedal is released and the accelerator operation is turned OFF (reference characters a2). Thereupon, the condition of the stop of the slip control is established, causing the slip control flag to be turned OFF (reference characters b2) and causing the drive force limitation flag to be turned OFF (reference characters c2). At this occasion, since the stepping down of the accelerator pedal has been released, the first requested driving force Fd1 based on the accelerator opening decreases to zero (0) (reference characters e1). However, the second requested driving force Fd2 subjected to the rate processing maintains predetermined magnitude (reference characters f1).

As described with reference to the flowchart in FIG. 6, in the case where the condition of the stop of the slip control is established (Y in step S11), the first requested driving force Fd1 and the motor driving force MF are compared to determine their magnitude relation (step S12), to determine the control target of the motor driving force MF. In other words, in the case where the first requested driving force Fd1 before the rate processing is smaller than the motor driving force MF (Y in step S12), the motor driving force MF is controlled toward the first requested driving force Fd1 before the rate processing (steps S12 and S13). In contrast, in the case where the first requested driving force Fd1 before the rate processing is greater than the motor driving force MF (N in step S12), the motor driving force MF is controlled toward the second requested driving force Fd2 after the rate processing (steps S12 and S15).

That is, as illustrated in FIG. 7, at time t3, at timing when the condition of the stop of the slip control is established, causing the driving force limitation flag to be turned OFF (reference characters c2), the first requested driving force Fd1 before the rate processing is smaller than the motor driving force MF (reference characters d2 and e1). Accordingly, the motor driving force MF is controlled toward the first requested driving force Fd1 before the rate processing. This makes it possible to slowly lower the motor driving force MF (reference characters d3), instead of rapidly increasing the motor driving force MF. Hence, it is possible to appropriately control the motor driving force MF in accordance with the release of the stepping down of the accelerator pedal. It is to be noted that as illustrated in FIG. 7, at time t4, in the case where the difference between the second requested driving force Fd2 and the motor driving force MF becomes equal to or smaller than the predetermined value AN (Y in step S14 in FIG. 6), the motor driving force MF is controlled toward the second requested driving force Fd2 after the rate processing.

(Transition Control: Timing Chart, Part 2)

Figure 8:
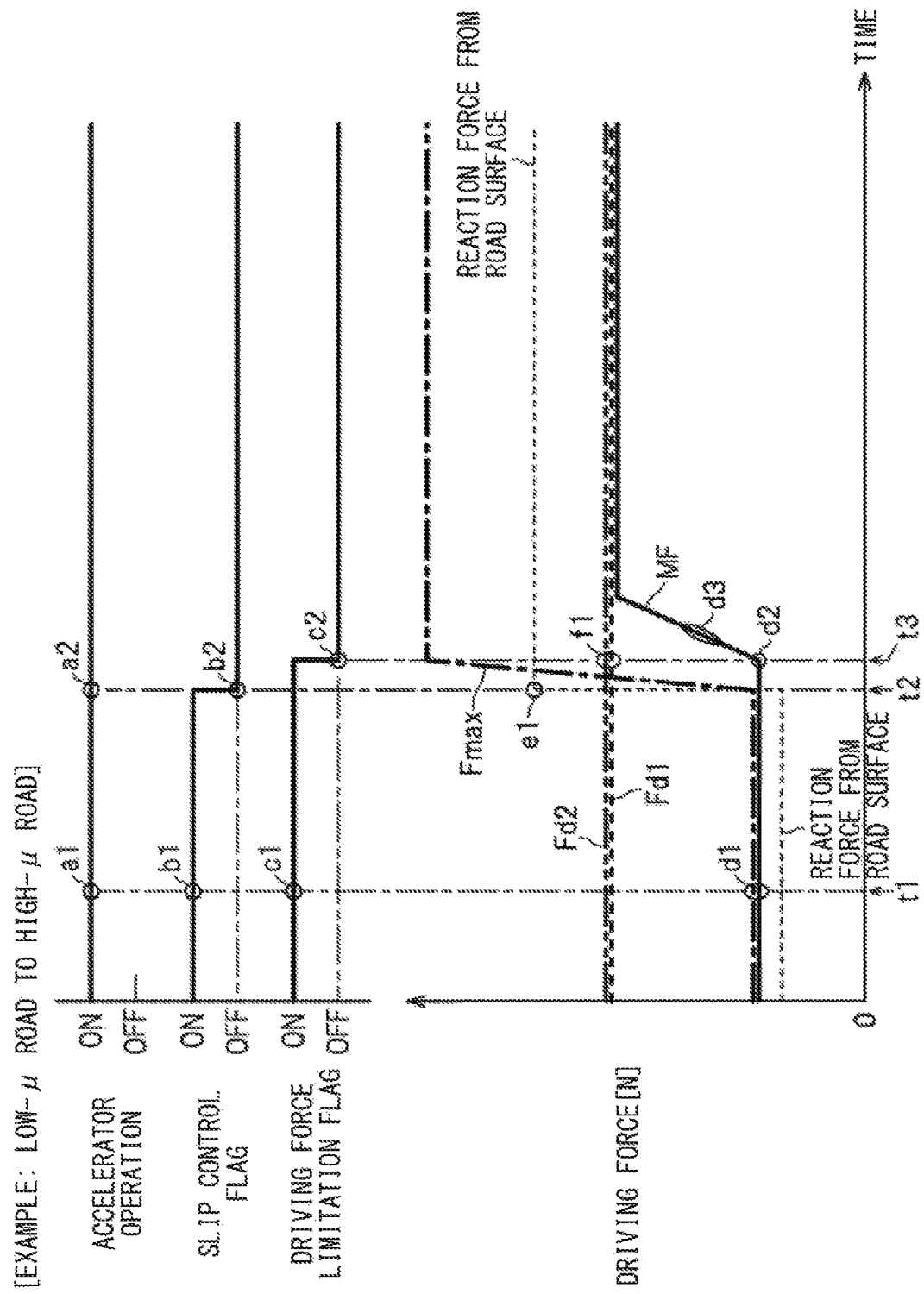
FIG. 8 is a timing chart of the progress in the execution of the slip control and the transition control.

Description is given next of the transition control in a case where the slip control is executed on the accelerated travel on the low-μ road, and thereafter, the slip control is stopped because of a decrease in the slip ratio. FIG. 8 is a timing chart of the progress in the execution of the slip control and the transition control.

As illustrated in FIG. 8, at time t1, the situation is that the accelerator operation is ON (reference characters a1), the slip control flag is ON (reference characters b1), and the driving force limitation flag is ON (reference characters c1). This is a situation that the slip control is in execution. In the slip control, the limited driving force Fmax is set to suppress the wheel slip of the rear wheel 12, and the motor driving force MF is limited not to become greater than the limited driving force Fmax (reference characters d1).

Thereafter, from time t2 to t3, with the stepping down of the accelerator pedal continued (reference characters a2), the road surface to be traveled on changes from the low-μ road to a high-μ road, causing the reaction force from the road surface to increase rapidly (reference characters e1). In this case, the wheel slip of the rear wheel 12 stops and the slip ratio decreases, causing the condition of the stop of the slip control to be established. Thus, the condition of the stop of the slip control is established, and thereupon, the slip control flag is turned OFF (reference characters b2), and the driving force limitation flag is turned OFF (reference characters c2). At this occasion, since the stepping down of the accelerator pedal is continued, the first requested driving force Fd1 and the second requested driving force Fd2 are maintained at substantially the same magnitude.

As described with reference to the flowchart in FIG. 6, in the case where the condition of the stop of the slip control is established (Y in step S11), the first requested driving force Fd1 and the motor driving force MF are compared to determine their magnitude relation (step S12), to determine the control target of the motor driving force MF. That is, in the case where the first requested driving force Fd1 before the rate processing is smaller than the motor driving force MF (Y in step S12), the motor driving force MF is controlled toward the first requested driving force Fd1 before the rate processing (steps S12 and S13). In contrast, in the case where the first requested driving force Fd1 before the rate processing is greater than the motor driving force MF (N in step S12), the motor driving force MF is controlled toward the second requested driving force Fd2 after the rate processing (steps S12 and S15).

That is, as illustrated in FIG. 8, at time t3, at the timing where the condition of the stop of the slip control is established, causing the driving force limitation flag to be turned OFF (reference characters c2), the first requested driving force Fd1 before the rate processing is greater than the motor driving force MF (reference characters d2 and f1). Accordingly, the motor driving force MF is controlled toward the second requested driving force Fd2 after the rate processing. This makes it possible to raise the motor driving force MF (reference characters d3), making it possible to appropriately control the motor driving force MF in accordance with the increase in the reaction force from the road surface. Moreover, the rate of change in the driving force in controlling the motor driving force MF toward the second requested driving force Fd2, as indicated by reference characters d3 in FIG. 8, may be set at a higher value than the rate of change in the driving force in controlling the motor driving force MF toward the first requested driving force Fd1, as indicated by reference characters d3 in FIG. 7. This makes it possible to quickly raise the motor driving force MF, in the case where the slip control is canceled because of the decrease in the slip ratio. Hence, it is possible to control the motor generator 13 with optimum responsiveness.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

In the foregoing description, a vehicle to which the vehicle control device 10 is applied is exemplified by an electric vehicle including a traveling motor as a power source, but this is non-limiting. The vehicle control device 10 may be also applicable to a hybrid vehicle including a traveling motor and an engine as power sources.

In the foregoing description, the main controller 21 may serve as the "driving force setting unit", and the motor controller 22 may serve as the "motor controller", but this is non-limiting. For example, a single controller may serve as the "driving force setting unit" and the "motor controller".

In the forgoing description, the condition of the execution of the slip control includes, for example, that the accelerator opening Acc is greater than the predetermined threshold Xa1 and the slip ratio S is greater than the predetermined threshold Xs1, but this is non-limiting. For example, the condition of the execution of the slip control may include that the accelerator opening Acc is greater than the predetermined threshold Xa1, the slip ratio S is greater than the predetermined threshold Xs1, and the second requested driving force Fd2 is greater than the motor driving force MF.

In the forgoing description, the condition of the stop of the slip control includes, for example, that the accelerator opening Acc is smaller than the predetermined threshold Xa2, or that the slip ratio S is smaller than the predetermined threshold Xs2, but this is non-limiting. For example, the condition of the stop of the slip control may include that the accelerator opening Acc is smaller than the predetermined threshold Xa2, that the slip ratio S is smaller than the predetermined threshold Xs2, or that the second requested driving force Fd2 is smaller than the motor driving force MF.

In the examples illustrated in FIGS. 7 and 8, at the timing when the driving force limitation flag is turned OFF (time t3), the first requested driving force Fd1 and the motor driving force MF are compared to determine their magnitude relation, but this is non-limiting. The comparison and the determination regarding their magnitude relation may be made at any timing after the condition of the stop of the slip control is established. For example, the first requested driving force Fd1 and the motor driving force MF may be compared to determine their magnitude relation at timing when the condition of the stop of the slip control is established, causing the slip control flag to be turned OFF.

According to the aspects of the disclosure, in stopping the slip control, the first requested driving force and the motor driving force are compared to determine their magnitude relation. In the case where the first requested driving force is smaller than the motor driving force, the motor driving force is controlled on the basis of the first requested driving force. Hence, it is possible to appropriately control the traveling motor.

The main controller 21 and the motor controller 22 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 21 and the motor controller 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 21 and the motor controller 22 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle control device configured to control a traveling motor coupled to a driving wheel of a vehicle, the vehicle control device comprising:
   a driving force setting unit configured to identify a first requested driving force from accelerator opening of the vehicle and a vehicle speed of the vehicle, and make dulling processing on the first requested driving force to set a second requested driving force, wherein making the dulling processing on the first requested driving force to set the second requested driving force includes, in a case where the first requested driving force changes from a first driving force value to a second driving force value different from the first driving force value at a first rate of change greater than a predetermined rate of change, setting the second requested driving force that changes from the first driving force value to the second driving force value at a second rate of change smaller than the first rate of change; and
   a motor controller configured to control, on a basis of the second requested driving force, a motor driving force to be outputted from the traveling motor, wherein
   the motor controller is configured to begin an execution of a slip control on a condition that the driving wheel slips on accelerated travel, the slip control including controlling the motor driving force on a basis of a limited driving force smaller than the second requested driving force, and
   when stopping the execution of the slip control, the motor controller is configured to: perform comparing the first requested driving force and the motor driving force; and control, when determining that the first requested driving force is smaller than the motor driving force using the comparing, the motor driving force on a basis of only the first requested driving force out of the first requested driving force and the second requested driving force.

2. The vehicle control device according to claim 1, wherein when stopping the execution of the slip control, the motor controller is configured to control, when determining that the first requested driving force is greater than the motor driving force using the comparing, the motor driving force on a basis of only the second requested driving force out of the first requested driving force and the second requested driving force.

3. The vehicle control device according to claim 1, wherein the execution of the slip control stops on a condition that the accelerator opening is smaller than a threshold.

4. The vehicle control device according to claim 2, wherein the execution of the slip control stops on a condition that the accelerator opening is smaller than a threshold.

5. The vehicle control device according to claim 1, wherein the execution of the slip control stops on a condition that a slip ratio of the driving wheel is lower than a threshold.

6. The vehicle control device according to claim 2, wherein the execution of the slip control stops on a condition that a slip ratio of the driving wheel is lower than a threshold.

7. The vehicle control device according to claim 3, wherein the execution of the slip control stops on a condition that a slip ratio of the driving wheel is lower than a threshold.

8. The vehicle control device according to claim 4, wherein the execution of the slip control stops on a condition that a slip ratio of the driving wheel is lower than a threshold.

9. A vehicle control device configured to control a traveling motor coupled to a driving wheel of a vehicle, the vehicle control device comprising
   circuitry configured to:
      identify a first requested driving force from accelerator opening of the vehicle and a vehicle speed of the vehicle, and make dulling processing on the first requested driving force to set a second requested driving force, wherein making the dulling processing on the first requested driving force to set the second requested driving force includes, in a case where the first requested driving force changes from a first driving force value to a second driving force value different from the first driving force value at a first rate of change greater than a predetermined rate of change, setting the second requested driving force that changes from the first driving force value to the second driving force value at a second rate of change smaller than the first rate of change; and
      control, on a basis of the second requested driving force, a motor driving force to be outputted from the traveling motor, wherein
   the circuitry is configured to begin an execution of a slip control on a condition that the driving wheel slips on accelerated travel, the slip control including controlling the motor driving force on a basis of a limited driving force smaller than the second requested driving force, and
   when stopping the execution of the slip control, the circuitry is configured to: perform comparing the first requested driving force and the motor driving force; and control, when determining that the first requested driving force is smaller than the motor driving force using the comparing, the motor driving force on a basis of only the first requested driving force out of the first requested driving force and the second requested driving force.

10. The vehicle control device according to claim 2, wherein the driving force setting unit is configured to identify the first requested driving force based on a map representing a relationship among the first requested driving force, the accelerator opening and the vehicle speed.

11. The vehicle control device according to claim 2, wherein the driving force setting unit is configured to, when stopping the execution of the slip control, set the second driving force value to zero, set a value of the first requested driving force to zero, and set a value of the second requested driving force to a value more than zero.

12. The vehicle control device according to claim 9, wherein when stopping the execution of the slip control, the motor controller is configured to control, when determining that the first requested driving force is greater than the motor driving force using the comparing, the motor driving force on a basis of only the second requested driving force out of the first requested driving force and the second requested driving force.

13. The vehicle control device according to claim 12, wherein the circuitry is configured to identify the first requested driving force based on a map representing a relationship among the first requested driving force, the accelerator opening and the vehicle speed.

14. The vehicle control device according to claim 12, wherein the circuitry is configured to, when stopping the execution of the slip control, set the second driving force value to zero, set a value of the first requested driving force to zero and set a value of the second requested driving force to a value more than zero.

15. A non-transitory computer readable medium storing instructions to control a traveling motor coupled to a driving wheel of a vehicle, the vehicle control device and executable by a processor, the instructions comprising:
    identifying a first requested driving force from accelerator opening of the vehicle and a vehicle speed of the vehicle, and make dulling processing on the first requested driving force to set a second requested driving force, wherein making the dulling processing on the first requested driving force to set the second requested driving force includes, in a case where the first requested driving force changes from a first driving force value to a second driving force value different from the first driving force value at a first rate of change greater than a predetermined rate of change, setting the second requested driving force that changes from the first driving force value to the second driving force value at a second rate of change smaller than the first rate of change;
    controlling, on a basis of the second requested driving force, a motor driving force to be outputted from the traveling motor;
    beginning an execution of a slip control on a condition that the driving wheel slips on accelerated travel, the slip control including controlling the motor driving force on a basis of a limited driving force smaller than the second requested driving force;
    comparing, when stopping the execution of the slip control, the first requested driving force and the motor driving force to determine magnitude relation; and
    controlling, when determining that the first requested driving force is smaller than the motor driving force using the comparing, the motor driving force on a basis of only the first requested driving force out of the first requested driving force and the second requested driving force.

16. The non-transitory computer readable medium according to claim 15, wherein the instructions further comprise
    controlling, when stopping the execution of the slip control and determining that the first requested driving force is greater than the motor driving force using the comparing, the motor driving force on a basis of only the second requested driving force out of the first requested driving force and the second requested driving force.

17. The non-transitory computer readable medium according to claim 16, wherein identifying the first requested driving force is identifying the first requested driving force based on a map representing a relationship among the first requested driving force, the accelerator opening and the vehicle speed.

18. The non-transitory computer readable medium according to claim 16, wherein, when stopping the execution of the slip control, the second driving force value is set to zero, set a value of the first requested driving force to zero and set a value of the second requested driving force to a value more than zero.

* * * * *